United States Patent [19]
Shimokawa et al.

[11] Patent Number: 5,501,913
[45] Date of Patent: Mar. 26, 1996

[54] GARNET POLYCRYSTALLINE FILM FOR MAGNETO-OPTICAL RECORDING MEDIUM

[75] Inventors: Kenji Shimokawa, Kawaskaki; Norikazu Kawamura, Tokyo, both of Japan

[73] Assignees: Nippon Steel Corporation; Nippon Hoso Kyokai, both of Japan

[21] Appl. No.: 791,653

[22] Filed: Nov. 13, 1991

[51] Int. Cl.$^6$ .............................. G11B 5/66; C04B 35/00
[52] U.S. Cl. ........................ 428/694 ML; 428/694 SC; 428/694 GT; 428/694 RE; 428/694 MM; 428/694 ST; 428/670; 428/678; 428/702; 428/900; 252/62.51 R; 252/62.57; 252/62.58; 252/62.6
[58] Field of Search .......................... 204/192; 428/694, 428/900, 694 ML, 694 SC, 694 GT, 694 RE, 694 MM, 694 ST, 670, 678, 702; 252/62.51, 62.57, 62.58, 62.6

[56] References Cited

U.S. PATENT DOCUMENTS

| | | | |
|---|---|---|---|
| 4,608,142 | 8/1986 | Gomi et al. | 204/192 M |
| 4,728,178 | 3/1988 | Gualtieri et al. | 350/377 |

FOREIGN PATENT DOCUMENTS

| | | |
|---|---|---|
| 63-98855 | 10/1988 | Japan . |
| 285196 | 11/1988 | Japan . |
| 261555 | 2/1989 | Japan . |
| 178105 | 8/1991 | Japan . |

OTHER PUBLICATIONS

Fujitsu Scientific and Technical Journal, vol. 26, No. 2, Jun. 1990, Kawasaki, pp. 156–163—K. Shono, H. Kano and S. Kuroda—Sputtered Garnet Media for Magneto-optic Recording, p. 157, col. 2, line 13–line 15; FIG. 2—p. 158, col. 1, line 14–col. 2, line 7.

Patent Abstracts of Japan, vol. 13, No. 80 (P-832) 23 Feb. 1989 & JP-A-63 261 555 (Fujitsu) 28 Oct. 1988.

Patent Abstracts of Japan, vol. 12, No. 46 (P-665) 12 Feb. 1988 & JP-A-62 192 047 (Fujitsu) 22 Aug. 1987.

Journal of Magnetism and Magnetic Materials, vol. 84, 1990, pp. 222–228—M. Abe and M. Gomi—Magneto-optical Recording on Garnet Films—p. 226, col. 2, line 43–p. 227, col. 1, line 25; FIG. 7.

H. Kano et al: IEEE Trans, Magn. MAG–25 (5), 3737 (1989).

The Digests of the 12th Annual Conference on Magnetics in Japan 127 (1989) by Ito et al.

The Digests of the 13th Annual Conference on Magnetics in Japan 49 (1989) by T. Suzuki et al. (Abstract only).

M. Abe and M. Gomi J. Magn. Magn. Matler, 84,222 (1990).

The Digests of the 10th Annual Conference on Magnetics in Japan, 31 (1986) by Ito et al.

"Sputtlered Garnet Film for Magneto–optical Disk", Light and Magnetism—Basis and Application Magnetism Seminar Text, 107 (1988).

Primary Examiner—L. Kiliman
Attorney, Agent, or Firm—Pollock, Vande Sande & Priddy

[57] ABSTRACT

A garnet polycrystalline film for a magneto-optical recording medium including at least two layers of polycrystalline garnet represented by $Bi_xR_{3-x}M_yFe_{5-y}O_{12}$, where $0 \leq X \leq 3$, $0 \leq Y \leq 5$, R represents one or more rare earth elements containing yttrium, and M represents Ga, Al or In, wherein crystal lattice constants of these adjacent two layers are different from each other by ±0.3% or more, and an average crystal grain diameter of one of the layers is smaller than that of the other layer and 1 μm or less, and a magneto-optical recording disk using this garnet polycrystalline film.

14 Claims, 3 Drawing Sheets

F I G. 1

10μm

10μm

GARNET POLYCRYSTALLINE FILM FOR MAGNETO-OPTICAL RECORDING MEDIUM

BACKGROUND OF THE INVENTION

1. Field of the Invention

The present invention relates to a garnet polycrystalline film for a magneto-optical recording medium, and more particularly to a garnet polycrystalline film for a magneto-optical recording medium composed of fine crystal grains useful for reduction of a noise derived from a grain boundary of garnet polycrystal.

2. Description of the Related Art

A garnet oxide is a material showing excellent performance as a recording material or a magneto-optical device such as a magneto-optical recording medium, an optical isolator and a magnetic field sensor. Since this material is non-magnetic in an amorphous state in general, it is used in a single crystal or polycrystal state. However, polycrystalline garnet which can be produced inexpensively is inferior in optical, magnetic and magneto-optical characteristics to the single crystal garnet due to existence of a grain boundary. In particular, improvement in performance of polycrystalline garnet is indispensable in order to apply the polycrystalline garnet as a magneto-optical recording medium.

The magneto-optical recording is the most useful technique for realizing high density and high reliability. The garnet material showing high corrosion resistance and having superior magneto-optical effect in a short wavelength is considered to be most promising as a next generation magneto-optical medium. This material is able to overcome defects such as low corrosion resistance and small magneto-optical effect of an amorphous rare earth-transition metal which has been utilized already.

As a method of further improving the recording density, multiple recording with a multilayer film utilizing transparency of garnet has also been proposed as disclosed in the Digests of the 10th Annual Conference on Magnetics in Japan, 31 (1986) by Ito et al.

Further, it has been known that when the garnet film is combined with conventional other metallic magneto-optical recording medium such as amorphous rare earth-transition metal alloy film or a multilayer of Pt and Co or Pd and Co, it is possible to improve magneto-optical effect utilizing the large Faraday rotation angle thereof, which is effective to obtain high performance of a magneto-optical recording medium.

A Bi substituted garnet film formed on a gallium-gadolinium-garnet (GGG) single crystal substrate shows a high performance of 60 dB in a carrier wave to noise ratio (signal to noise ratio under standard conditions) in read/write characteristics (H. Kano et al.: IEEE Trans. Mgn. MAG-25(5), 3737 (1989)). However, a garnet film formed on an inexpensive glass substrate and the like, which is polycrystalline, has such a drawback that a medium noise is big because of optical nonuniformity (nonuniform distribution of refractive index) derived from the grain boundary.

In order to form a polycrystalline garnet film of high performance on a glass substrate and the like, fining of crystal grains is effective to reduce optical nonuniformity due to the grain boundary of crystals (for example, M. Abe and M. Gomi: J. Magn. Magn. Mater;, 84, 222 (1990)). As a method for fining crystal grains, it is known to add specific elements (for example, Ito et al.: The Digests of the 12th Annual Conference on Magnetics in Japan, 127 (1989)) or to apply a rapid (heat treatment) crystallization method (T. Suzuki et al.: The Digests of the 13th Annual Conference on Magnetics in Japan, 49 (1989)). In "Sputtered Garnet Film for Magneto-optical Disk" by Shono. et al., Light and Magnetism—Basis and Application, Magnetics Seminar Text, 107 (1988), Shono has reported that in observation of a garnet film after complete crystallization by a transmission electronic microscope, fine crystal grains are observed in the garnet film formed on a surface of (111) GGG single crystal face having a lattice constant which differs by approximately 1% from that of the garnet film, but no fine crystal grain is observed on a calcium-magnesium-zirconium substituted gadolinium-gallium-garnet (GCGMZ) single crystal substrate having lattice constant which is different by approximately 0.3% of the garnet film and epitaxial growth has been made.

The present inventors have produced amorphous oxide film having a garnet structure (Bi, Ga substituted Dy, Fe garnet) after crystallization, respectively, on GGG single crystal substrates of different orientations, observed a crystallization process by heat treatment in detail, and confirmed that fine garnet crystal grains have been preferentially generated at an interface with the single crystal substrate having a crystal lattice constant which differs by ±0.3% or more. This is considered to be caused by a fact that the interface energy with crystalline nucleus generation is less increased at the interface between the amorphous film having a garnet structure after crystallization and the garnet single crystal than inside of the amorphous film or on the film-free surface. A non-uniform nucleus generation occurs with priority at the interface. It is also considered that epitaxial growth is obstructed because of a large misfit of the lattice constants and a single crystal film in the strict sense of the words is not formed on the single crystal substrate, thus forming fine crystals.

SUMMARY OF THE INVENTION

It is an object of the present invention to provide a garnet polycrystalline film composed of fine crystal grains for magneto-optical recording medium of high performance.

It is another object of the present invention to provide a magneto-optical recording disk using a high performance magneto-optical recording medium having a garnet polycrystalline film composed of fine crystal grains.

The substrate on which a garnet polycrystalline film of the present invention is formed includes substrates made of an amorphous material such as glass, a single crystal material of garnet and a polycrystalline material of garnet.

The garnet polycrystalline film of the present invention includes two layers of the polycrystalline garnet represented by $Bi_xR_{3-x}M_yFe_{5-y}O_{12}$ (where $0 \leq X \leq 3$, $0 \leq Y \leq 5$, R represents one or more rare earth elements containing yttrium, and M represents Ga, Al or In. In order to materialize polycrystalline garnet film of two layers in which a garnet crystal grain diameter in one layer is smaller than the garnet crystal grain diameter in the other layer and at 1 μm or less, the crystal lattice of one of adjacent garnet layers differs by ±0.3% or more, and preferably by ±0.5% or more from that of the other layer. In a crystallization process, crystal grains are fined by utilizing generation of fine crystal grains from the interface between a garnet layer and an amorphous layer having a garnet structure after crystallization. Fine grains are also formed while crystallizing on the first garnet layer on the substrate by raising the substrate temperature during formation of the second garnet layer. Further, Cu is added in an amount of 5 at.% or less of the total atoms of the garnet excluding oxygen, in order to obtain a coercive force at 1 KOe or more. A multilayer film of three or more layers can also be used as a multiple recording magneto-optical recording medium when above-described conditions are satisfied with respect to one or more two-layer sets. It is possible to deposit an amorphous rare earth-transition metal alloy or a multilayer of Pt and Co or Pd and Co on such a two-layer film of fine crystal garnet, which is also useful to improve magneto-optical effect.

The multilayer film may be crystallized by any of the following methods; that is (1) a multilayer is formed while crystallizing by raising substrate temperature during film formation, (2) each layer is crystallized by heat treatment after each film formation, (3) a multilayer is first formed of layers of amorphous state such that the crystallizing temperatures of adjacent layers are different, and then crystallized by heat treatment at two or more different temperatures, or (4) two or more garnet layers, of which adjacent two have different crystallizing temperatures, are laminated on a substrate while raising the substrate temperature thereby crystallizing one or more layers during film formation thereof and then the remaining layers are crystallized by heat treatment after film formation.

The present inventors have considered from the result of experimental study with a single crystal substrate described in the related art. That is, fine grains are expected at the boundary between a garnet polycrystalline layer and an amorphous layer having a garnet structure after crystallization. Fine grains are also expected to form while crystallizing on the first garnet layer by raising the substrate temperature during formation of the second garnet layer. Thus, generation of fine crystal grains is realized at the boundary between two garnet layers formed on a glass substrate and having lattice constants different from each other by ±0.3% or more, preferably ±0.5% or more.

Further, as disclosed in JP-A-3-178105 (1991) by the present inventors, the coercive force of a garnet film for a magneto-optical medium is increased to 5 KOe or more by adding Cu therein. It is confirmed that the addition of Cu is also effective to increase the coercive force of the garnet film of the present invention.

A multilayer film formed by depositing a recording layer of TbFeCo or a multilayer of Pt and Co or Pd and Co on a two-layer film of the present invention is effective to obtain a reproducing signal at a high sensitivity due to a large Faraday rotation angle of a garnet layer thereof having optically uniform fine crystals.

Furthermore, it is possible to make a magneto-optical disk having a very small noise (noise comes from the grain boundary) by forming on a glass disk a polycrystalline garnet film having fine crystal grains according to the present invention.

Such a garnet multilayer film is formed on a substrate by a sputtering method, a thermal decomposition method or the like. The sputtering method may be carried out by substrate heating or application of a bias voltage in an atmosphere of an Ar gas or a mixed gas of Ar and Oxygen. In crystallization of a film of the same composition, the crystallization temperature is generally different depending on whether the crystallization is performed during film formation or the crystallization is performed by heat treatment after film formation. In crystallization during film formation, it is required to raise the substrate temperature to higher than 400° C. In crystallization by heat treatment after film formation, it is required to perform heat treatment at a temperature higher than 450° C.

In a combination of garnets of which the crystal lattice constants differ from each other by ±0.3% or more, polycrystalline garnets represented by $Bi_xR_{3-x}M_yFe_{5-y}O_{12}$ (where $0 \leq X \leq 3$, $0 \leq Y \leq 5$, R represents one or more types of rare earth elements containing yttrium, and M represents Ga, Al or In) are most promising for the magneto-optic recording medium. When the rare earth site is substituted for Bi or the like having a large ion radius, the crystal lattice constant becomes larger with increase of X. When the Ga, Al or the like having a small ion radius are used for substituting for the Fe site, the crystal lattice constant becomes smaller with increase of Y. Further, the crystallization temperature also differs depending on the composition of garnet. Accordingly, examples of combination of garnets of which the crystal lattice constants differ from each other by ±0.3% or more include a combination of garnets composed of different elements such as $Gd_3Fe_5O_{12}$ (12.47 Å) and $Dy_3Fe_5O_{12}$ (12.41 Å) whose lattice constants differ by 0.5% or GGG (12.38 Å) and $Tb_3Fe_5O_{12}$ (12.44 Å) whose lattice constants differ by 0.5% and a combination of garnets composed of the same elements but having different compositions such as $Bi_{0.5}Dy_{2.5}Fe_5O_{12}$ (12.44 Å) and $Bi_2Dy_1Fe_5O_{12}$ (12.51 Å) whose lattice constants differ by 0.6% or $Y_3Al_1Fe_4O_{12}$ (12.31 Å) and $Y_3Al_4Fe_1O_{12}$ (12.09 Å) whose lattice constants differ by 1.8%, where the values in parentheses indicate the lattice constants, respectively.

Each layer in the garnet multilayer film may be utilized as a polycrystalline substrate for forming a metastable layer which requires a garnet structure for the substrate.

BRIEF DESCRIPTION OF THE DRAWINGS

FIG. 1 is a photograph of 15,000 magnifications showing a fine structure of a $Bi_2Dy_1Ga_1Fe_4O_{12}$ layer formed on a $Bi_{0.3}Tb_{2.7}Ga_{0.3}Fe_{4.7}O_{12}$ layer observed by a scanning electron microscope.

DESCRIPTION OF THE PREFERRED EMBODIMENTS

Figure 2A:
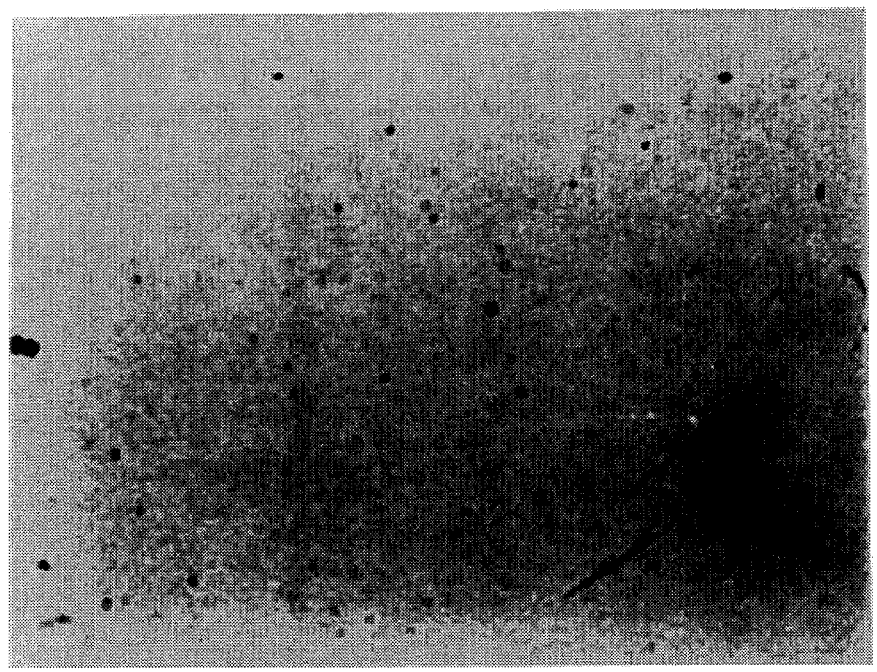
FIG. 2A is a photograph of 1,000 magnifications showing a fine structure of a two-layer film of a $Bi_2Dy_1Ga_1Fe_4O_{12}$ layer formed on a $Bi_{0.3}Tb_{2.7}Ga_{0.3}Fe_{4.7}O_{12}$ layer on a glass substrate observed by a transmission type optical microscope.

Embodiments of the present invention will be described with reference to the accompanying drawings. The conditions in depositing a garnet film by a radio frequency sputtering method in the embodiments are as follows.

Target: Ceramic target having a diameter of 80 mm

Radio frequency power: 200 W

Sputtering gas: Argon or mixed gas of argon and oxygen

Gas pressure: 10–30 m Torr (oxygen partial pressure at 30% or less)

Substrate: glass

Substrate temperature: 10° C.–550° C.

Film thickness: 100 Å–5,000 Å
Heat treatment temperature: 540° C.–750° C. (in the atmosphere)
Composition determining method:
Assuming that atomic ratio of metallic elements to oxygen is at 8 to 12, the composition is computed based on evaluation of only metallic elements through inductively coupled plasma (ICP) analysis.

Embodiment 1) A garnet polycrystalline film is produced by a sputtering method with a combination of $Bi_{2.6}Dy_{0.4}Ga_{1.1}Fe_{3.9}O_{12}$ (lattice constant 12.56Å, average crystal grain diameter is 12 μm when formed directly on a glass substrate, hereinafter called as layer a) and $Bi_{2.0}Dy_{1.0}Ga_{1.5}Fe_{3.5}O_{12}$ (lattice constant 12.50Å, lattice constant differs from the layer a by 0.5%, average crystal grain diameter is 3 μm when formed directly on a glass substrate, hereinafter called as layer b).

In case of crystallization by heat treatment after film formation, the crystallization temperature of the layer a is at 560° C., and that of the layer b is at 620° C. It is required to raise the substrate temperature to 500° C. or higher for crystallization during film formation.

A two-layer film according to claim 1 was produced by depositing layers b and a on a substrate in an order of a/b/substrate at the substrate temperature of 500° C. The average crystal grain diameter in the layer a at this time was 0.1 μm.

A garnet polycrystalline film of two layers having a coercive force of 5 KOe was produced by adding Cu at 3 at.% by using a composite target during deposition of the layer a under the same sputtering conditions. The average crystal grain diameter in the layer a at this time was 0.1 μm.

A garnet polycrystalline film of three layers was produced in such a manner that, after three amorphous layer b, a and b were laminated in that order alternately on a substrate (b/a/b/substrate) without raising the substrate temperature, first the layer a only was crystallized through heat treatment at 560° C., and then the two layers b were crystallized through heat treatment at 620° C. The crystal grain diameter in the layer b at this time was 0.2 μm.

A garnet polycrystalline film of six layers was produced by depositing three layers a each added with Cu at 2 at.% and three layers b in an order of a/b/a/b/a/b/substrate alternately and crystallizing them in the same manner as that in production of the two-layer garnet polycrystalline film. At this time, the coercive force and the average crystal grain diameter of the layer a were 3.5 KOe and 0.1 μm, respectively.

A Kerr rotation enhanced film of three layers was produced by depositing by using an alloy target an amorphous film of Tb Fe Co on a film of two layers a and b, which were crystallized by each heat treatment after deposition of each layer on a substrate. The order of the layers was TbFeCo/a/b/substrate. The average crystal grain diameter in the layer a was 0.1 μm and the Kerr rotation angle of Tb Fe Co film for a laser light having a wavelength of 514 nm incident from its substrate side was increased by 10 times.

Figure 3:
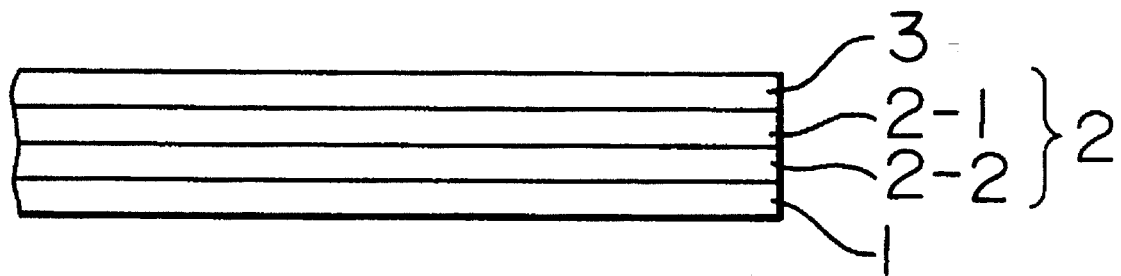
FIG. 3 is a partial sectional view showing a structure of a magneto-optical recording disk according to the present invention.

A magneto-optical disk as shown in FIG. 3 was made by depositing a two-layer film 2 of a layer a 2-1 and a layer b 2—2 on a glass disk substrate 1 having a diameter of 5.25 inches and then forming on the two-layer film a Cr film 3 serving as both heat absorption and light reflection by using a metallic target of Cr having a diameter of 150 mm. In this case, the layer 2—2 was first deposited on the substrate and the layer 2-1, to which Cu was added in an amount of 3 at.% by using a Cu-added ceramic target having a diameter of 150 mm thereby achieving a coercive force of 5 KOe, was deposited on the layer 2—2. The temperature of the substrate was 500° C. during the deposition of the layers 2-1 and 2—2. A carrier to noise ratio of 50 dB or more was achieved by this disk when recorded by an Ar laser having a wavelength of 514 nm.

In either case, it was possible to make a uniform film of garnet polycrystalline layers of which a crystal grain diameter of one layer was 1 μm or less and smaller than that of adjacent another layer.

Other embodiments are shown in Table 1. In all the embodiments (1) to (9), it was possible to make a garnet two-layer film in which fine polycrystals having a crystal grain diameter of 1 μm or less and smaller than the original diameter had grown during crystallization process at the boundary between one garnet layer and an amorphous layer having a garnet structure after crystallization. It will be understood from the following explanation with reference to the attached photographs that these fine garnet polycrystalline film are considered very useful as magneto-optical recording media.

Figure 2B:
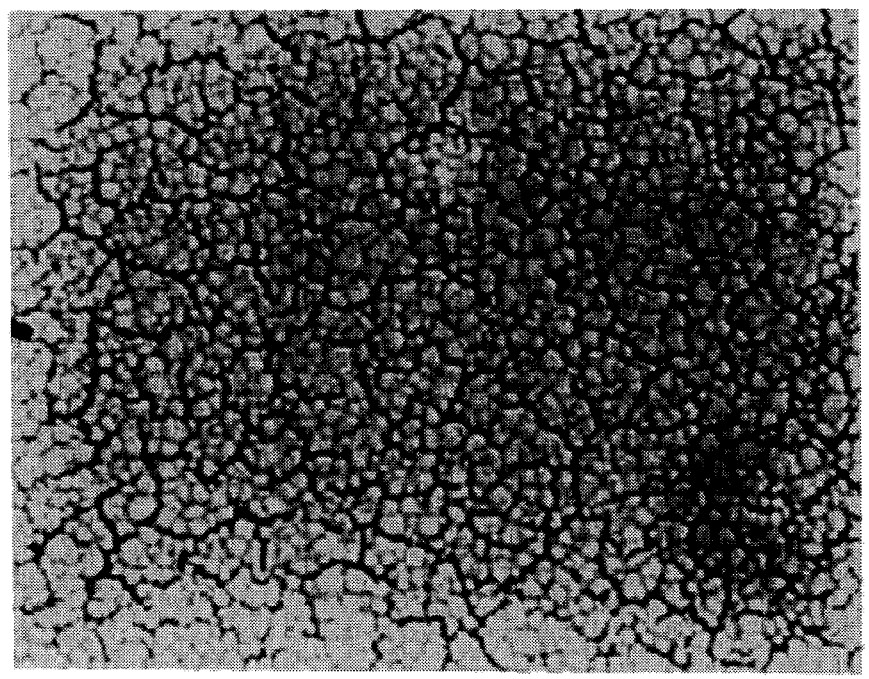
FIG. 2B is a photograph of 1,000 magnifications showing a fine structure of a $Bi_2Dy_1Ga_1Fe_4O_{12}$ layer having the same thickness formed directly on a glass substrate observed by a transmission type optical microscope.

FIG. 1 is a photograph showing a section of the layer a of the embodiment 2 during crystallization which is observed by a scanning electron microscope. It is seen that fine crystal grains (region B) having a diameter of 0.5 μm or less are generated with priority at the interface (region A) with the crystallized layer b (average crystal grain diameter of 2 μm). Here, region C is an amorphous region. FIGS. 2a and 2b are photographs observed by a transmission optical microscope respectively showing the two-layer film of the embodiment 2 and a one-layer film of the layer a formed directly on a glass substrate. The crystal grain boundary, which is observed in the one-layer film (average crystal grain diameter of 3 μm) formed directly on the glass substrate, is not clearly observed in the two-layer film of the embodiment 2 due to growth of fine polycrystals.

Each of the two-layer film of the embodiment 3 and a single-layer film of the layer a alone of the embodiment 3 having the same film thickness formed directly on a glass substrate was investigated with respect to a configuration of a bit, which was written thereon by He—Ne laser having a wavelength of 633 nm while applying an external magnetic field at 100 Oe. An irregular bit configuration along the crystal grain boundary is observed in the single-layer film formed directly on the glass substrate, but a circular bit having an excellent configuration is written on the two-layer film of the embodiment 3, indicating that it is very useful as a magneto-optical recording medium.

As explained above with respect to the embodiments of the present invention, when garnet layers are laminated on a substrate to form a film such that adjacent two of the layers, which may be two different garnet layers or one garnet layer and an amorphous layer exhibiting a garnet structure after crystallization, are each represented by the composition of $Bi_xR_{3-x}M_yFe_{5-y}O_{12}$ (where $0 \leq X \leq 3$, $0 \leq Y \leq 5$, R represents one or more rare earth elements including yttrium and M represents Ga, Al or In) and exhibit lattice constants after crystallization different from each other by 0.3% or more and the film of garnet layers are crystallized by raising the substrate temperature during film formation or by heat treatment after film formation, fine crystal grains having an average crystal grain diameter of 1 μm or less and smaller than the crystal grain diameters of one of the layers are generated during the crystallization process at the boundary between the adjacent two layers. A garnet polycrystalline film having fine crystal grains of small diameter and formed on an inexpensive substrate is useful as a magneto-optical recording media or an enhancement layer of a magneto-optical rotation.

TABLE 1

| Embodiments | | | Lattice constant difference (%) | Crystal grain diameter of layer b (μm) | Crystal grain diameter of layer a (μm) |
|---|---|---|---|---|---|
| 2 | Layer a | $Bi_{2.0}Dy_{1.0}Ga_{1.0}Fe_{4.0}O_{12}$ | 0.9 | 2 | 0.5 |
|   | Layer b | $Bi_{0.3}Tb_{2.7}Ga_{0.3}Fe_{4.7}O_{12}$ | | | |
| 3 | Layer a | $Bi_{2.0}Dy_{1.0}Ga_{1.0}Fe_{4.0}O_{12}$:Cu2at % | 0.9 | 2 | 0.5 |
|   | Layer b | $Bi_{0.3}Tb_{2.7}Ga_{0.3}Fe_{4.7}O_{12}$ | | | |
| 4 | Layer a | $Bi_{2.6}Dy_{0.4}Ga_{1.1}Fe_{3.9}O_{12}$:Cu3at % | 0.6 | 3 | 0.1 |
|   | Layer b | $Bi_{2.0}Dy_{1.0}Ga_{2.0}Fe_{3.0}O_{12}$ | | | |
| 5 | Layer a | $Bi_{2.6}Dy_{0.4}Ga_{1.1}Fe_{3.9}O_{12}$ | 1.6 | 3 | 0.5 |
|   | Layer b | $Bi_{2.0}Y_{1.0}Al_{2.0}Fe_{3.0}O_{12}$ | | | |
| 6 | Layer a | $Bi_{2.0}Dy_{1.0}Ga_{1.0}Fe_{4.0}O_{12}$ | 0.5 | 2 | 0.2 |
|   | Layer b | $Bi_{1.4}Dy_{1.6}Ga_{1.0}Fe_{4.0}O_{12}$ | | | |
| 7 | Layer a | $Bi_{2.6}Dy_{0.4}Ga_{1.1}Fe_{3.9}O_{12}$ | 0.5 | 2 | 0.2 |
|   | Layer b | $Bi_{2.0}Gd_{1.0}Ga_{5.0}O_{12}$ | | | |
| 8 | Layer a | $Bi_{2.0}Dy_{1.0}In_{1.1}Fe_{3.9}O_{12}$ | 1.2 | 5 | 0.5 |
|   | Layer b | $Bi_{2.2}Dy_{0.8}Ga_{2.0}Fe_{3.0}O_{12}$ | | | |
| 9 | Layer a | $Bi_{2.0}Dy_{1.0}Ga_{1.1}Fe_{3.9}O_{12}$ | 0.3 | 3 | 0.3 |
|   | Layer b | $Bi_{1.8}Dy_{1.2}Ga_{2.0}Fe_{3.0}O_{12}$ | | | |

We claim:

1. A garnet polycrystalline film for a magneto-optical recording medium comprising:

two layers of polycrystalline garnet represented by $Bi_xR_{3-x}M_yFe_{5-y}O_{12}$ where $0 \leq X \leq 3$, $0 \leq Y \leq 5$, R represents one or more rare earth elements including yttrium, and M represents Ga, Al or In); wherein:

said two layers being adjacent to each other and having crystal lattice constants different by ±0.3% or more, and an average crystal grain diameter of one of the layers being smaller than that of the other layer and 1 μm or less.

2. A garnet polycrystalline film according to claim 1, wherein Cu is added to at least one of said two layers in an amount of 5 at.% or less of total atoms of the garnet excluding oxygen and the one layer has a coercive force of 1 KOe or more.

3. A garnet polycrystalline film according to claim 1, further comprising at least one garnet polycrystalline layer laminated to the two layers and represented by $Bi_xR_{3-x}M_yFe_{5-y}O_{12}$ where $0 \leq X \leq 3$, $0 \leq Y \leq 5$, R represents one or more rare earth elements including yttrium, and M represents Ga, Al or In.

4. A garnet polycrystalline film according to claim 1, further comprising a film deposited on the two layers and formed of an amorphous rare earth transition metal alloy, or a multilayer of Pt and Co or Pd and Co.

5. A garnet polycystatlline film according to claim 1 wherein the two layers adjacent to each other have crystal lattice constants different by ±0.5% or more.

6. A garnet polycrystalline film according to claim 3, wherein Cu is added to at least one of said polycrystalline garnet layers in an amount of 5 at.% or less of total atoms of the garnet excluding oxygen and the one layer has a coercive force of 1 KOe or more.

7. A magneto-optical recording disk comprising:
a substrate; and
a garnet polycrystalline film formed on said substrate;
wherein: said garnet film includes two layers of polycrystalline garnet represented by $Bi_xR_{3-x}M_yFe_{5-y}O_{12}$ where $0 \leq X \leq 3$, $0 \leq Y \leq 5$, R represents one or more rare earth elements including yttrium, and M represents Ga, Al or In) said two layers being adjacent to each other and having crystal lattice constants different from each other by ±0.3% or more; and an average crystal grain diameter of one of the layers being smaller than that of the other layer and 1 μm or less.

8. A magneto-optical recording disk according to claim 7, wherein Cu is added to at least one of said two layers in an amount of 5 at.% or less of total atoms of the garnet excluding oxygen and the one layer has a coercive force of 1 KOe or more.

9. A magneto-optical recording disk according to claim 7, wherein said garnet polycrystalline film further includes at least one garnet polycrystalline layer deposited on the two layers and represented by $Bi_xR_{3-x}M_yFe_{5-y}O_{12}$ (where $0 \leq X \leq 3$, $0 \leq Y \leq 5$, R represents one or more rare earth elements including yttrium, and M represents Ga, Al or In.

10. A magneto-optical recording disk according to claim 7 wherein the two layers adjacent to each other have crystal lattice constants different by ±0.5% or more.

11. The magneto-optical recording disk of claim 7 wherein said substrate is an amorphous substrate.

12. The magneto-optical recording disk of claim 7 wherein said substrate is glass.

13. A magneto-optical recording disk according to claim 7, wherein said garnet polycrystalline film further includes a film laminated on the two layers and formed of an amorphous rare earth-transition metal alloy, or a multilayer of Pt and Co or Pd and Co.

14. A magneto-optical recording disk according to claim 9, wherein Cu is added to at least one of said polycrystalline garnet layers in an amount of 5 at.% or less of total atoms of the garnet excluding oxygen and the one layer has a coercive force of 1 KOe or more.

* * * * *

UNITED STATES PATENT AND TRADEMARK OFFICE
CERTIFICATE OF CORRECTION

PATENT NO. :   5,501,913
DATED      :   March 26, 1996
INVENTOR(S):   Shimokawa et al.

It is certified that an error appears in the above-identified patent and that said Letters Patent is hereby corrected as shown below:

On the title page: Item

—[30]     Foreign Application Priority Data

November 14, 1990 [JP] ············· 02-307600—

Signed and Sealed this

Twenty-seventh Day of August, 1996

Attest:

BRUCE LEHMAN

Attesting Officer    Commissioner of Patents and Trademarks